United States Patent

[11] 3,594,596

| [72] | Inventor | John Frederick Eastham |
| | | Long Ditton, Surry, England |
| [21] | Appl. No. | 812,203 |
| [22] | Filed | Apr. 1, 1969 |
| [45] | Patented | July 20, 1971 |
| [73] | Assignee | National Research Development Corporation |
| | | London, England |
| [32] | Priority | Apr. 9, 1968 |
| [33] | | Great Britain |
| [31] | | 16983/68 |

[54] HOMOPOLAR ELECTRICAL MACHINES
4 Claims, 8 Drawing Figs.

| [52] | U.S. Cl. | 310/178 |
| [51] | Int. Cl. | H02k 31/00 |
| [50] | Field of Search | 322/48; 310/178, 260, 261, 264, 268 |

[56] References Cited
UNITED STATES PATENTS

| 1,255,838 | 2/1918 | Knoll | 310/178 |
| 1,327,349 | 1/1920 | Morse | 310/178 |
| 1,465,251 | 8/1923 | Broluska | 310/178 |

OTHER REFERENCES

STEINMETZ PUBLICATION TK. 2181.57, THEORY & CALCULATION OF ELECTR. APPARATUS 1st Edition 1917; McGraw-Hill Book Co., N.Y., N.Y. 310/178

*Primary Examiner*—Milton O. Hirshfield
*Assistant Examiner*—R. Skudy
*Attorney*—Cushman, Darby & Cushman ABSTRACT: A homopolar electrical machine having a sectorially subdivided rotor wherein there are two magnetically separate current paths in each sector, which current paths are magnetically coupled to a corresponding current path of an adjacent sector at either side to reduce commutation induced voltages.

HOMOPOLAR ELECTRICAL MACHINES

This invention relates to homopolar electrical machines.

A homopolar machine comprises a rotating disc or drum having electrically conducting paths thereon and a stator having means for generating a homopolar magnetic field which is cut by the conducting paths on the rotor as the rotor rotates. Such machines operate at low voltage and high current.

In order to increase the voltage and thus reduce the current for a given output it has recently been proposed to sectorially subdivide the rotor, each sector having a conducting path which is connected at its ends to a segment of one of a pair of commutators. Each commutator has a set of brushes bearing thereon and the center-to-center spacing of the brushes in the two sets is the same and is two or more times the spacing of the segments of the commutators. The brushes are dimensioned to bridge adjacent segments in passing from one to the next and the brushes of the first set are electrically connected to brushes of the second set to effect a series connection between external terminals of those conducting paths whose associated contact segments are both in contact with the brushes, the arrangement being such that at certain positions of the rotor some conducting paths are connected in series while between each pair of such series-connected paths there is at least one path which is not connected in the said series connection.

In operation of a machine described above the current in each sector of the rotor will thus change from full current when the sector is in a series connection to half current when the brushes bridge across between adjacent segments and then to zero when the sector is not in the series connection. This repetitive change in current will induce voltages in the conducting paths of the rotor which is liable to cause sparking between the brushes and the commutators, and it is an object of the invention to provide a design of rotor in which such induction effects are reduced as far as possible.

According to the present invention in a homopolar electrical machine of the kind in which the rotor is sectorially subdivided into a plurality of separate conducting paths, the conducting paths in each sector are magnetically coupled to the adjacent sectors on either side.

Preferably each sector has two parallel conducting paths for current both connected at their ends to the same segment of a commutator and each path is magnetically coupled to a corresponding path of an adjacent sector by positioning the paths in the adjacent sectors in juxtaposition to each other. Improved coupling may be achieved by arranging that each of the parallel paths itself comprises two or more conductor bars and the conductor bars of a path in one sector are interleaved with the conductor bars of a path in an adjacent sector.

Instead of providing two parallel paths in each sector, the conductor area of a sector may itself have a sectorlike shape and magnetic coupling can then be achieved by arranging that adjacent sectors overlap.

In order that the invention may be more fully understood reference will now be made to drawings accompanying this specification in which.

Figure 1:
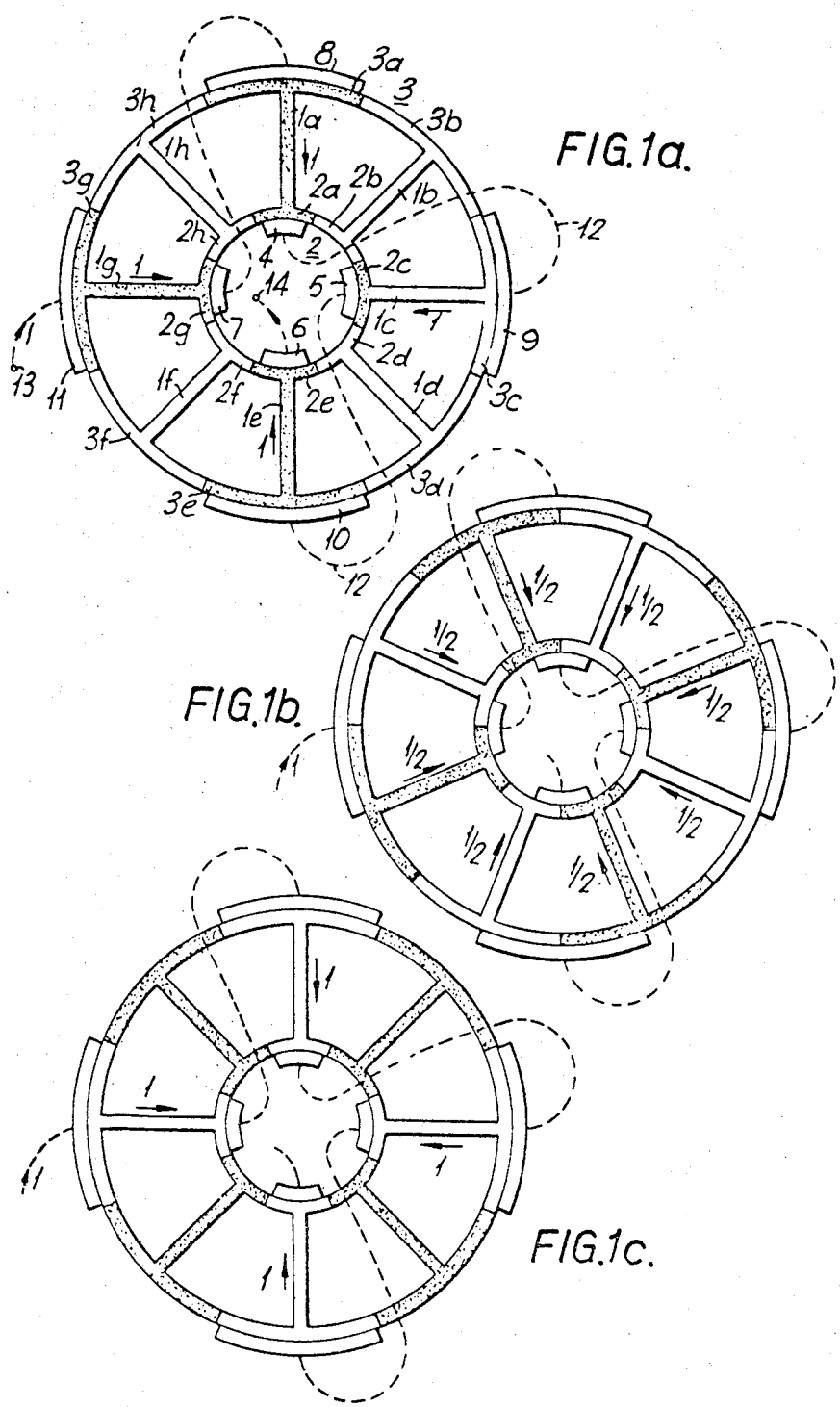
FIGS. 1a, 1b and 1c illustrate the rotor of a previously proposed sectorially subdivided machine in three different positions.

Referring now to FIG. 1, there is shown therein a rotor of a sectorially subdivided homopolar machine. Such a machine comprises a plurality of radially extending conducting paths, the machine in the Figure having eight such paths numbered 1a to 1h respectively. The radially inner ends of each of the paths are connected to segments of a commutator 2 and commutator 2 thus has eight segments numbered 2a to 2h respectively. The outer ends of the conducting paths are connected to a commutator 3 also having eight segments numbered 3a to 3h respectively. A set of four fixed brushes 4, 5, 6 and 7 bears on commutator 2 another set of four fixed brushes 8, 9, 10 and 11 bears on commutator 3. Conducting links are provided between the brushes of the two sets which are interconnected in the manner shown by the dotted line 12. Brush 11 is connected to one output terminal 13 and brush 6 is connected to another output terminal 14.

With the machine in operation and with the relative position of the rotor and brushes being as shown in FIG. 1a, it will be seen that the full rotor current I is carried by every alternate sector of the rotor and the intermediate sectors carry no current. Thus sectors 1a, 1c, 1e and 1g carry current I and sectors 1b, 1d, 1f and 1h carry no current. As the rotor rotates the brushes in both sets bridge across adjacent segments of the commutators to cause all the sectors to carry current and the magnitude of such current at the position shown in FIG. 1b is now ideally 1/2 in each sector. Further rotation of the rotor as shown in FIG. 1c results in the complete cessation of current in sectors 1a, 1c, 1e and 1g and sectors 1b, 1d, 1f and 1h now carry the full current I.

Figure 2:
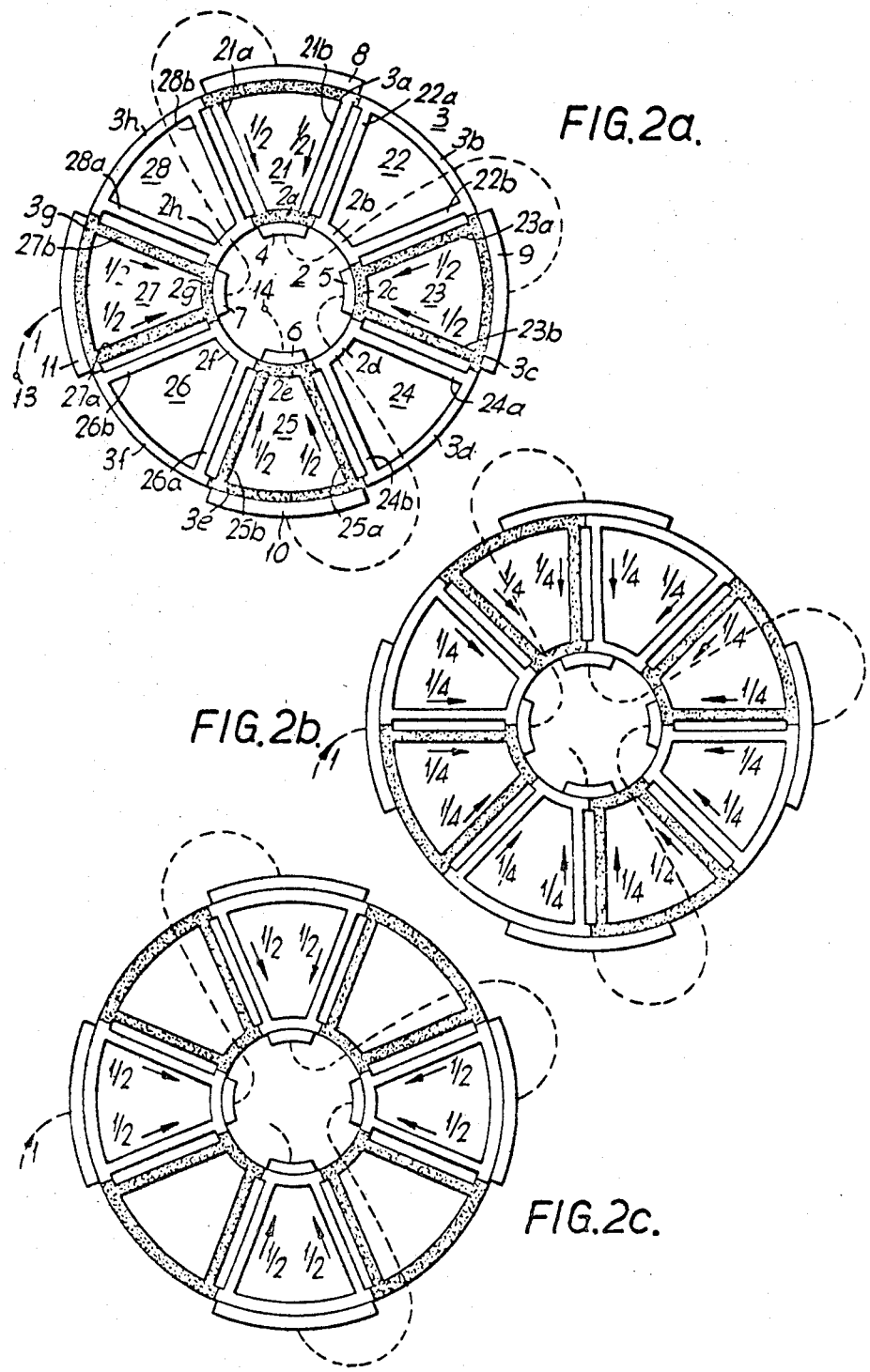
FIGS. 2a, 2b and 2c illustrate the rotor of a sectorially subdivided machine in accordance with the present invention in similar positions.
Figure 3:
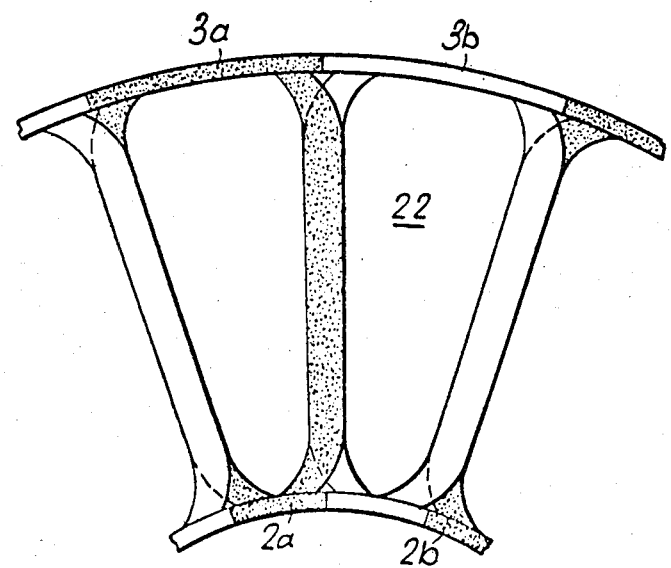
FIGS. 3 and 4 show an improved construction of the rotor according to the present invention.

The effect of the continuous change in the magnitude of the current carried in each sector results in a changing flux pattern in the rotor and thus the induction of voltages in the sectors which will modify the current transfer and may cause sparking at the brushes. In order to avoid such inductive effects the current carrying paths in each sector are arranged in the manner shown in FIG. 2. The brushes and commutator segments in FIG. 2a, 2b and 2c are similar to the corresponding items in FIG. 1 and are similarly referenced but the sectors now each have two parallel conducting paths. There are eight sectors in all, as in the FIG. 1 arrangement, and these sectors are numbered 21 to 28 inclusive. Sector 21 has two parallel conducting paths 21a and 21b connected between the segments 2a and 3a, sector 22 has two conducting paths 22a and 22b connected between the commutator segments 2b and 3b, and so on for each sector, with sector 28 having two conducting paths 28a and 28b connected between commutator segments 2h and 3h. The respective paths in each sector lie close the radial boundaries of the sectors so that a path in one sector lies in juxtaposition to a path in the next adjacent sector. Thus paths 11b and 12a are in juxtaposition as are paths 12b and 13a and so on around the rotor until paths 18b and 11a. Each conducting path takes half the current of a sector so that as the rotor rotates the current in any one conducting path changes from 1/2 to 1/4 to zero and back again. However since a conducting path of one sector is adjacent to a conducting path of the next sector it will be magnetically coupled thereto and the resultant current in each of such magnetically coupled combinations remains substantially constant as the rotor rotates. Thus apart from the effect of any leakage flux no voltages will be induced in the rotor due to the current switching effect of the commutators and hence more effective current transfer is possible.

Figure 4:
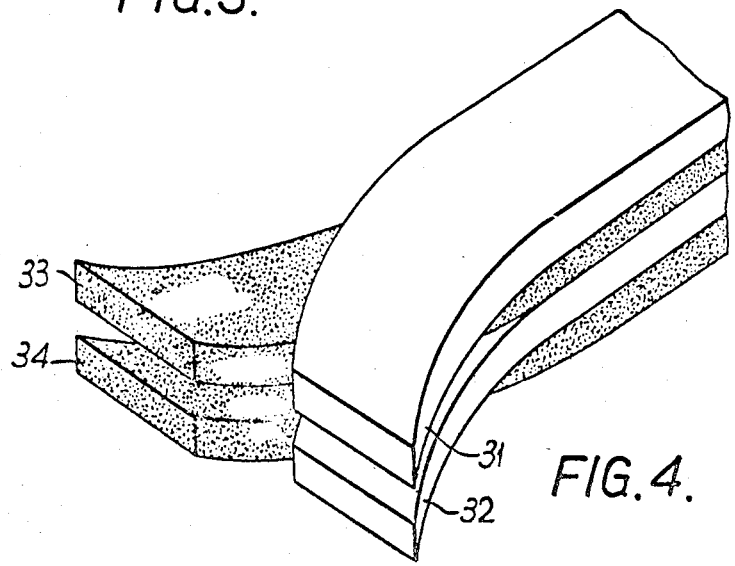

It will be seen that the greater the degree of magnetic coupling between conducting paths in adjacent sectors the less will be the magnitude of such induced voltages and in place of the simple juxtaposition of paths shown in FIGS. 2a, 2b and 2c a more complete coupling can be achieved in the manner shown in FIGS. 4 and 5. In these Figures in place of conducting paths consisting of a single conductor, each conducting path may comprise a plurality of conducting bars such as bars 31 and 32 of one conducting path and the bars 33 and 34 which constitute a conducting path in an adjacent sector. The bars 31 and 32 are interleaved with the bars 33 and 34 so that a high degree of magnetic coupling is achieved thereby.

An alternative arrangement for achieving magnetic coupling between the sectors is that the conductive paths in each sector themselves have a sectorlike or fanlike shape and each such sector overlaps the adjacent sectors on either side.

I claim:

1. A homopolar electrical machine including a sectorially subdivided rotor each sector whereof has two paths for rotor current magnetically separate from each other and electrically connected in parallel, and magnetic coupling means between individual ones of said paths and corresponding paths of adjacent sectors on either side whereby commutation induced voltages in a sector are reduced.

2. The machine as claimed in claim 1 in which the magnetic coupling means comprises the juxtaposition of a conducting path in one sector with a conducting path in an adjacent sector.

3. The machine as claimed in claim 1 in which each of the conducting paths itself comprises at least two conductor bars.

4. The machine as claimed in claim 3 in which the magnetic coupling means comprises the interleaving of the conductor bars of a path in one sector with the conductor bars of a path in an adjacent sector.